US012742464B2

(12) United States Patent
Sun et al.

(10) Patent No.: US 12,742,464 B2
(45) Date of Patent: Sep. 22, 2026

(54) SMALL DISPLACEMENT HYDRAULIC ACTUATOR

(71) Applicant: ZHEJIANG KC MECHANICAL & ELECTRICAL CO.,LTD., Zhejiang (CN)

(72) Inventors: Xiaowei Sun, Zhejiang (CN); Haoyu Ying, Zhejiang (CN); Qunshuai Sun, Zhejiang (CN)

(73) Assignee: ZHEJIANG KC MECHANICAL & ELECTRICAL CO., LTD., Zhejiang (CN)

(*) Notice: Subject to any disclaimer, the term of this patent is extended or adjusted under 35 U.S.C. 154(b) by 0 days.

(21) Appl. No.: 19/056,588

(22) Filed: Feb. 18, 2025

(65) Prior Publication Data

US 2026/0160278 A1 Jun. 11, 2026

(30) Foreign Application Priority Data

Dec. 10, 2024 (CN) ......................... 202423041021.6

(51) Int. Cl.
*F15B 15/14* (2006.01)
*F15B 13/04* (2006.01)
*F15B 21/041* (2019.01)

(52) U.S. Cl.
CPC ........ *F15B 15/149* (2013.01); *F15B 13/0401* (2013.01); *F15B 21/041* (2013.01)

(58) Field of Classification Search
CPC .. F15B 21/041; F15B 13/0401; F15B 15/149; B60K 17/105
See application file for complete search history.

(56) References Cited

U.S. PATENT DOCUMENTS 5,622,051 A * 4/1997 Iida .................... F16H 57/0415 60/487
2001/0000847 A1* 5/2001 Hauser .................... F16D 39/00 60/487

* cited by examiner

*Primary Examiner* — Abiy Teka
(74) *Attorney, Agent, or Firm* — Shichrur & Co.

(57) ABSTRACT

The present application provides a small displacement hydraulic actuator. The hydraulic actuator includes a shell body, a main power shaft is installed on the shell body, and an oil distribution plate is fixedly installed in an inner cavity of the shell body; the main power shaft is connected to the oil distribution plate through a plunger pump; the output shaft is connected to the oil distribution plate through a plunger motor, and power transmission between the plunger pump and the plunger motor is realized by conducting an oil passage channel; the main power shaft is arranged perpendicular to the output shaft; and an oil inlet cover is further arranged on the oil distribution plate, an oil inlet is formed in the oil inlet cover, a filter element is axially installed at the oil inlet in a floating mode.

11 Claims, 11 Drawing Sheets

SMALL DISPLACEMENT HYDRAULIC ACTUATOR

TECHNICAL FIELD

The present application relates to the technical field of mechanical transmission, in particular to a small displacement hydraulic actuator.

BACKGROUND

A hydraulic drive axle or hydraulic actuator is a structure that achieves power output through hydraulic actuation. It converts power input from an engine and outputs the power. Small displacement or small size hydraulic drive axles are one of the current development trends in the industry.

The applicant submitted the Chinese Patent Application No. 202210162653.4 in 2022, which discloses a zero-turn hydraulic drive axle. The zero-turn hydraulic drive axle includes a shell body, a first driving assembly is arranged in the shell body, one end of the first driving assembly is connected to an external power input apparatus for power input, and the other end of the first driving assembly is connected to an external rotatable output apparatus for power output. The first driving assembly includes: a plunger pump and a plunger motor, one end of the plunger pump matches with the power input apparatus to realize active turning of the plunger pump, the other end of the plunger pump is connected to an external oil pipe for oil inlet or oil supply, the plunger motor matches with the rotatable output apparatus, and power transmission from the plunger pump to the plunger motor is realized through an oil passage between the plunger pump and the plunger motor. The hydraulic drive axle adopts a design of dual driving assemblies with identical structures, internally integrating a gear transmission set and a bi-directional-output drive shaft.

Therefore, a small displacement hydraulic actuator may be designed to be applicable to the development needs of small displacement and small size.

SUMMARY

(i) Technical Problem to be Solved

In view of this, the present application provides a small displacement hydraulic actuator, applicable to small-scale actuators. The actuator has a small overall structure, so subsequent installation and arrangement are convenient.

(ii) Technical Solution

An embodiment of the present specification provides the following technical solution.

The embodiment of the present specification provides a small displacement hydraulic actuator, including a shell body. A main power shaft connected with an external power source is installed on the shell body, and an oil distribution plate is fixedly installed in an inner cavity of the shell body; the main power shaft is connected to the oil distribution plate through a plunger pump, and an output shaft for directly outputting to outside the shell body is installed on the oil distribution plate; the output shaft is connected to the oil distribution plate through a plunger motor, and power transmission between the plunger pump and the plunger motor is realized by conducting an oil passage channel; the main power shaft is arranged perpendicular to the output shaft, the plunger pump is arranged perpendicular to the plunger motor, and vertical power reversal is realized through the oil distribution plate; and an oil inlet cover is further arranged on the oil distribution plate, an oil inlet is formed in the oil inlet cover, a filter element is axially installed at the oil inlet in a floating mode, and a positioning spring is installed between the filter element and an inner wall of the shell body.

In the solution, the main power shaft transmits power to the plunger motor through the plunger pump and the oil distribution plate, and only one group of plunger pump and plunger motor is arranged; the main power shaft and the power output shaft are arranged perpendicular to each other, so an arrangement is reasonable; the output shaft is driven by the plunger motor to directly output to outside the shell body, the output shaft is then connected to an external traveling mechanism (such as a traveling wheel or crawler belt) together with an external transmission mechanism such as a gear or a chain wheel, and the hydraulic actuator has a light overall structure and is applicable for small-displacement and light-weight application; in addition, the hydraulic oil entering the oil distribution plate may be filtered through the filter element, and oil supply to the internal oil passages in the oil distribution plate may be realized through the oil inlet; and the filter element is convenient to position and install, a gap is preserved between the outer side of the filter element and the inner wall of the shell body, the filter element is positioned and installed in the shell body through the positioning spring, it is not necessary to consider machining errors relating to a length or dimensions of the filter element, and a problem that the shell body cannot be assembled due to an excessive length of the filter element is avoided.

In some embodiments, a bypass valve and a control valve rod configured to control a valve port of the bypass valve to open or close are further arranged on the oil distribution plate, and the bypass valve is configured to control an oil passage channel in the oil distribution plate to conduct to or close with the inner cavity of the shell body; and the control valve rod is rotatably installed in the shell body, and a downward pressing protrusion is eccentrically arranged on the control valve rod.

In the solution, the downward pressing protrusion is configured to control the valve port of the bypass valve to open or close; and the output shaft is externally connected to the travelling mechanism. When the main power shaft does not rotate or the plunger pump does not work, if the output shaft rotates, the hydraulic oil in the plunger motor would backflow to the oil distribution plate, so at the moment, the valve port of the bypass valve needs to be always in an open status. When the main power shaft rotates to work, the valve port of the bypass valve is closed.

In some embodiments, a driving sheet connected to the control valve rod is installed on the shell body, and the driving sheet is used for connection to the external control console; and/or a valve seat of the bypass valve is installed on the oil distribution plate, and a valve ball and a valve ball spring are installed at the valve port; and when the control valve rod is rotated, the downward pressing protrusion makes contact with and downwardly presses the valve ball to enable the valve port to open.

In the solution, the control valve rod is fixedly connected to the driving sheet; the driving sheet is connected to the external control console, the downward pressing protrusion of the control valve rod is driven by the driving sheet to rotate and thus presses the valve ball at the valve port to open the valve port, at the moment, the oil passage in the oil distribution plate conducts to the inner cavity of the shell body, and the bypass valve is in an open status; and the valve ball spring always pushes the valve ball to press it against the valve port in a sealed mode.

In some embodiments, an adjustment cam plate and a control shift lever connected to the adjustment cam plate are rotatably installed on the shell body; the plunger pump includes a first plunger cylinder body connected to the oil distribution plate and a first plunger axially installed in the first plunger cylinder body in a movable mode, and the first plunger cylinder body is coaxially and rotatably connected to the main power shaft; and a first thrust bearing at the plunger pump is installed in the adjustment cam plate, and an angle of inclination of the first thrust bearing is adjusted by rotating the adjustment cam plate.

In the solution, the first plunger cylinder body is coaxially and rotatably connected to the main power shaft; the adjustment cam plate is fixedly connected to the control shift lever, and the control shift lever is connected to the external control console; the adjustment cam plate may be forwardly and backwardly adjusted and rotated to drive the first thrust bearing to achieve adjustment of the angle of inclination, so the adjustment cam plate may be used to adjust power output of the plunger pump and even reversal output of power (realized by forward inclination or backward inclination of the first thrust bearing), and when a side end face of the first thrust bearing is vertically arranged, at the moment, the first plunger does not generate axial displacement and does not work; and through the arrangement of the adjustment cam plate and the control shift lever, power output and reversal of the entire hydraulic actuator maybe realized, and “stepless speed change” may be realized.

In some embodiments, the plunger motor includes a second plunger cylinder body connected to the oil distribution plate, a second plunger and a second thrust bearing, and the second plunger cylinder body is coaxially and rotatably connected to the output shaft; and the second thrust bearing is arranged in the inner cavity of the shell body.

In the solution, the second thrust bearing of the plunger motor is installed in the shell body, and its angle of inclination cannot be adjusted; and hydraulic power oil of the plunger pump enters the second plunger cylinder body of the plunger motor through the oil distribution plate, the second plunger is driven to achieve axial displacement and work, and at the moment, the second plunger cylinder body of the plunger motor is enabled to rotate so as to drive the output shaft to rotate.

In some embodiments, a first end face corresponding to the plunger pump and a second end face corresponding to the plunger motor are arranged on the oil distribution plate, and the first end face and the second end face are perpendicular to each other; and a first oil passage and a second oil passage are arranged on the first end face, and a third oil passage conducting to the first oil passage and the fourth oil passage conducting to the second oil passage are arranged on the second end face.

In the solution, the first end face needs to be installed in a way that it fits the plunger pump, and the second end face needs to be installed in a way that it fits the plunger motor; the first end face and the second end face are arranged perpendicular to each other, so that the main power shaft and the output shaft are arranged perpendicular to each other, thus realizing vertical power reversal; and through the arranged oil passage, power of the plunger pump can be transmitted to the plunger motor, thus driving the output shaft to rotate and realize power output.

In some embodiments, the inner cavity of the shell body is injected with hydraulic oil in a sealed mode, and the oil inlet cover is installed on the oil distribution plate in a split mode; and the oil inlet is connected into the oil passage channel in the oil distribution plate through a one-way valve, and the hydraulic oil in the shell body is supplied to internal oil passages in the oil distribution plate through the oil inlet.

In the solution, the entire inner cavity of the shell body is injected with the hydraulic oil in a sealed mode, and the hydraulic oil of the inner cavity of the shell body is filtered through the filter element and then enters the oil distribution plate through the oil inlet for oil supply, thus maintaining a balance between internal and external oil pressures.

In some embodiments, a driving wheel and a cooling fan blade are installed on the main power shaft; and sealing oil seals are installed on both the main power shaft and the output shaft. In the solution, the power of an external engine is transmitted to the main power shaft through the driving wheel, and the main power shaft is driven to rotate, thereby driving the plunger pump to work.

In some embodiments, the output shaft is connected to an external traveling mechanism; and the shell body is connected to an oil return pot through an oil pipe, the oil return pot is connected into the inner cavity of the shell body, and a height of the oil return pot is higher than that of the shell body.

In the solution, the oil return pot conducts to the inner cavity of the shell body, and the height of the oil return pot is larger than a height of the shell body, so that when the hydraulic actuator is working, the hydraulic oil in the inner cavity of the shell body undergoes heat expansion. Therefore, through the arrangement of the oil return pot, a situation that a service life of the hydraulic actuator is influenced by excessively large oil pressure in the inner cavity.

In some embodiments, an inner side of the filter element is installed at an installation cavity of the oil inlet cover through a positioning gasket, a gap is preserved between an outer side of the filter element and the inner wall of the shell body, the filter element is axially limited in a floating mode through the positioning spring, and the filter element is positioned between the oil inlet cover and the inner wall of the shell body.

In the solution, the filter element is limited by the positioning spring, the filter element is convenient to install, and the filter element does not interfere with installation of other components.

(III) Beneficial Effects

Compared with the prior art, at least one technical solution above adopted by the embodiment of the present specification can at least achieve the beneficial effects that: the present disclosure is applicable to small displacement actuators, an overall structure is small, subsequent installation is convenient, and a spatial arrangement is reasonable; the main power shaft transmits power to the plunger motor through the plunger pump and the oil distribution plate, thus driving the output shaft to rotate; through the eccentric downward pressing protrusion of the control valve rod, the bypass valve is controlled to open or close, and when the output shaft connected to the travelling mechanism actively rotates and the plunger pump does not output power, by opening the bypass valve, the hydraulic oil in the oil distribution plate may be inlet into the inner cavity of the shell body through the bypass valve; by arranging the adjustment cam plate to control the angle of inclination of the first thrust bearing of the plunger pump, oil pressure output power of the plunger pump is adjusted, and “stepless speed change" may be realized; and the filter element may filter the hydraulic oil at the oil inlet, the filter element is installed by the positioning spring in the shell body, the filter element is convenient to install, and the filter element does not interfere with installation of other components.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

Figure 1:
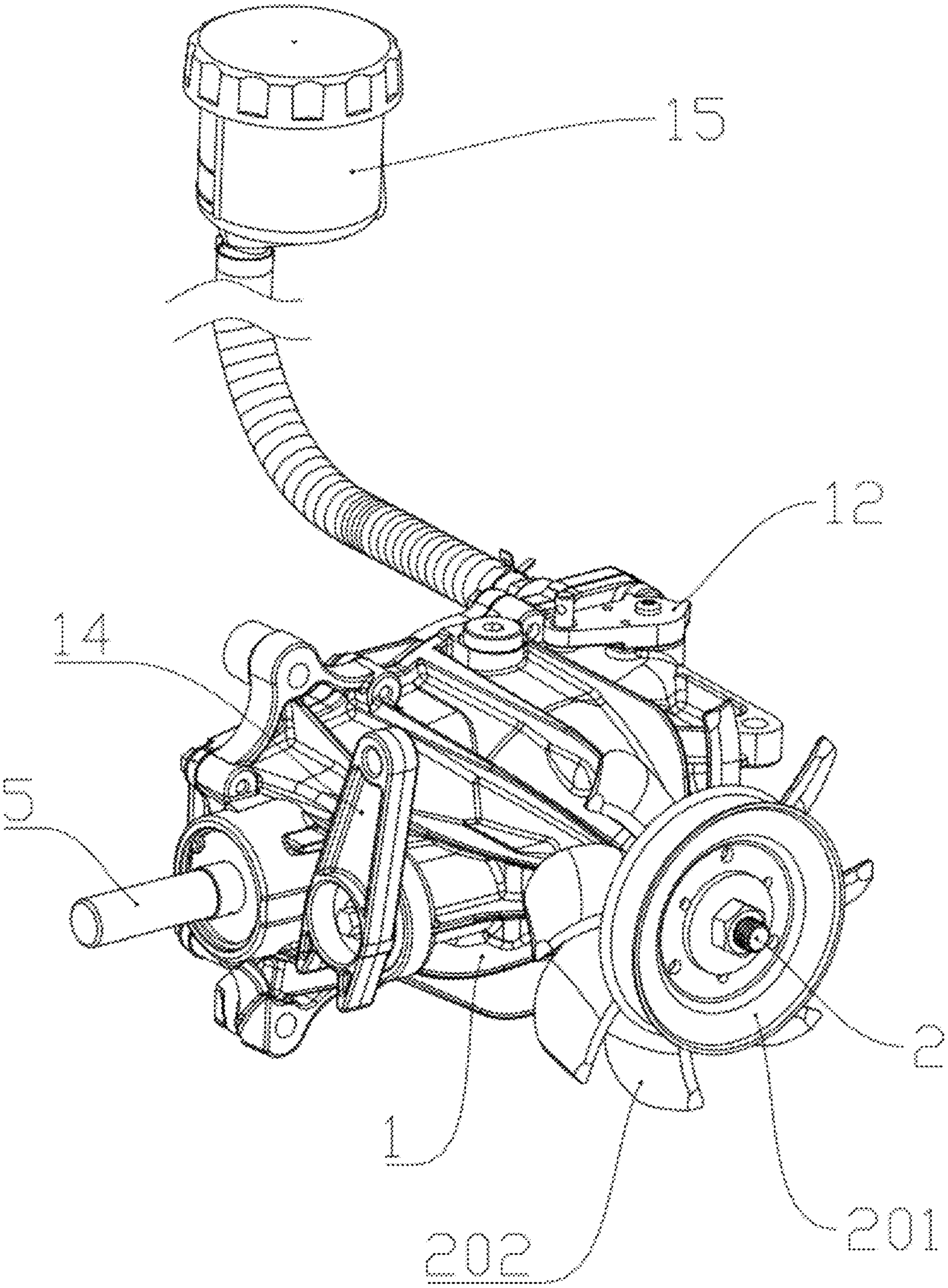
FIG. 1 is a three-dimensional diagram in the present application.

In the drawings: 1 is a shell body, 2 is a main power shaft, 3 is an oil distribution plate, 4 is a plunger pump, 5 is an output shaft, 6 is a plunger motor, 7 is an oil inlet cover, 8 is a filter element, 9 is a positioning spring, 10 is a bypass valve, 11 is a control valve rod, 12 is a driving sheet, 13 is an adjustment cam plate, 14 is a control shift lever, 15 is an oil return pot, 201 is a driving wheel, 202 is a cooling fan blade, 301 is a first end face, 302 is a second end face, 303 is a first oil passage, 304 is a second oil passage, 305 is a third oil passage, 306 is a fourth oil passage, 401 is a first plunger cylinder body, 402 is a first plunger, 403 is a first thrust bearing, 601 is a second plunger cylinder body, 602 is a second plunger, 603 is a second thrust bearing, 701 is an oil inlet, 702 is an installation cavity, 1001 is a valve port, 1002 is a valve seat, 1003 is a valve ball, 1004 is a valve ball spring, and 1101 is a downward pressing protrusion.

DETAILED DESCRIPTION

The specific implementations of the disclosure will be described in further detail below with reference to the accompanying drawings and embodiments. The following embodiments are used to illustrate the disclosure, but are not intended to limit the scope of the disclosure. Further, in the following description, specific details are provided to facilitate a thorough understanding of the examples. However, those skilled in the art to which the present disclosure belongs will understand that practice may be realized without these specific details.

As shown in FIG. 1 to FIG. 12, the present application provides a small displacement hydraulic actuator, including a shell body 1. A main power shaft 2 is installed on the shell body 1, and an oil distribution plate 3 is fixedly installed in an inner cavity of the shell body 1; the main power shaft 2 is connected to the oil distribution plate 3 through a plunger pump 4, and an output shaft 5 for directly outputting to outside the shell body 1 is installed on the oil distribution plate 3; the output shaft 5 is connected to the oil distribution plate 3 through a plunger motor 6, and power transmission between the plunger pump 4 and the plunger motor 6 is realized by conducting an oil passage channel; and the main power shaft 2 is arranged perpendicular to the output shaft 5, the plunger pump 4 is arranged perpendicular to the plunger motor 6, and power reversal is realized through the oil distribution plate 3.

Figure 6:
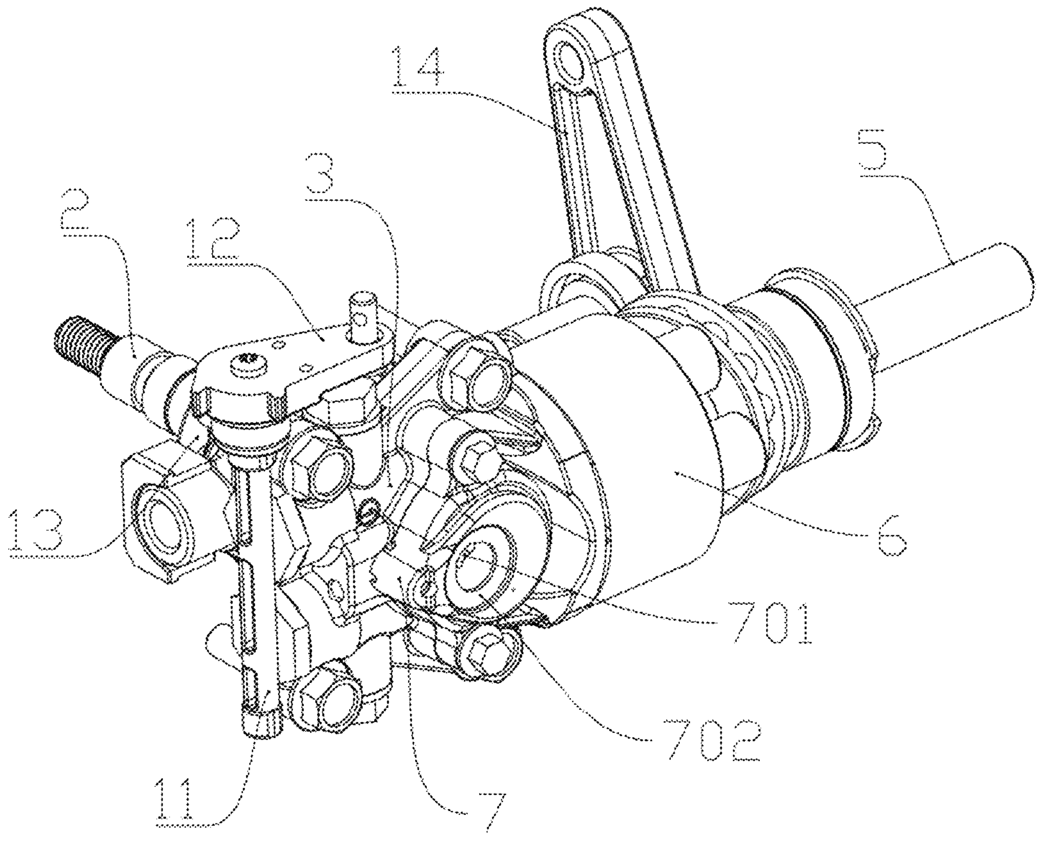
FIG. 6 is a three-dimensional diagram of a part relevant to an oil inlet cover in the present application.

As shown in FIG. 6, an oil inlet cover 7 is further arranged on the oil distribution plate 3, an oil inlet 701 is formed in the oil inlet cover 7, a filter element 8 is axially installed at the oil inlet 701 in a floating mode, and a positioning spring 9 is installed between the filter element 8 and an inner wall of the shell body 1. The filter element 8 may filter the hydraulic oil entering the oil distribution plate 3, oil supply to the internal oil passage in the oil distribution plate 3 may be achieved through the oil inlet 701, and therefore oil pressure balance may be maintained.

In the embodiment, the main power shaft 2 transmits power to the plunger motor 6 through the plunger pump 4 and the oil distribution plate 3, thus driving the output shaft 5 to rotate; an overall arrangement is reasonable, a structure is light, and the hydraulic actuator is applicable for small-displacement and light-weight application.

Figure 2:
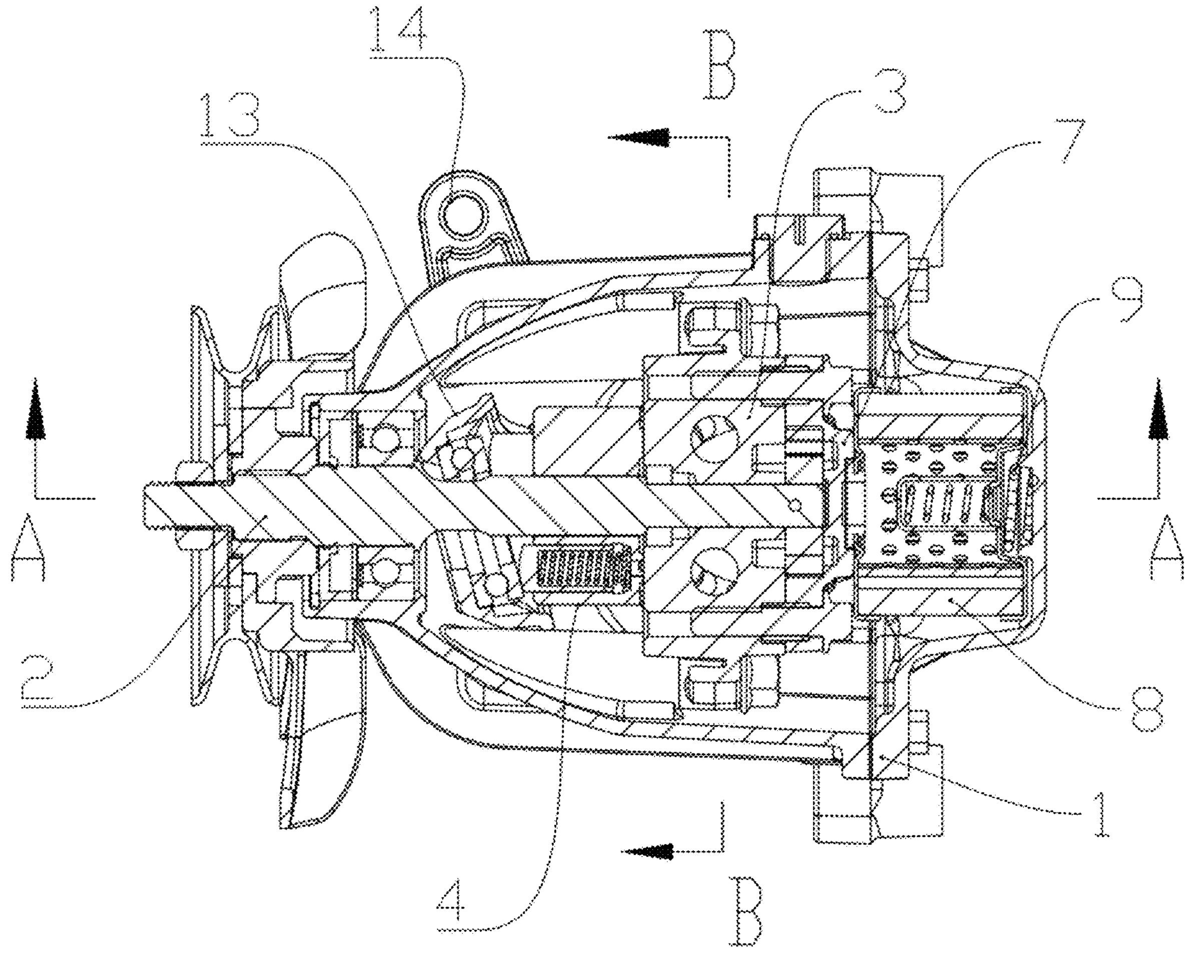
FIG. 2 is a section view in the present application.
Figure 11:
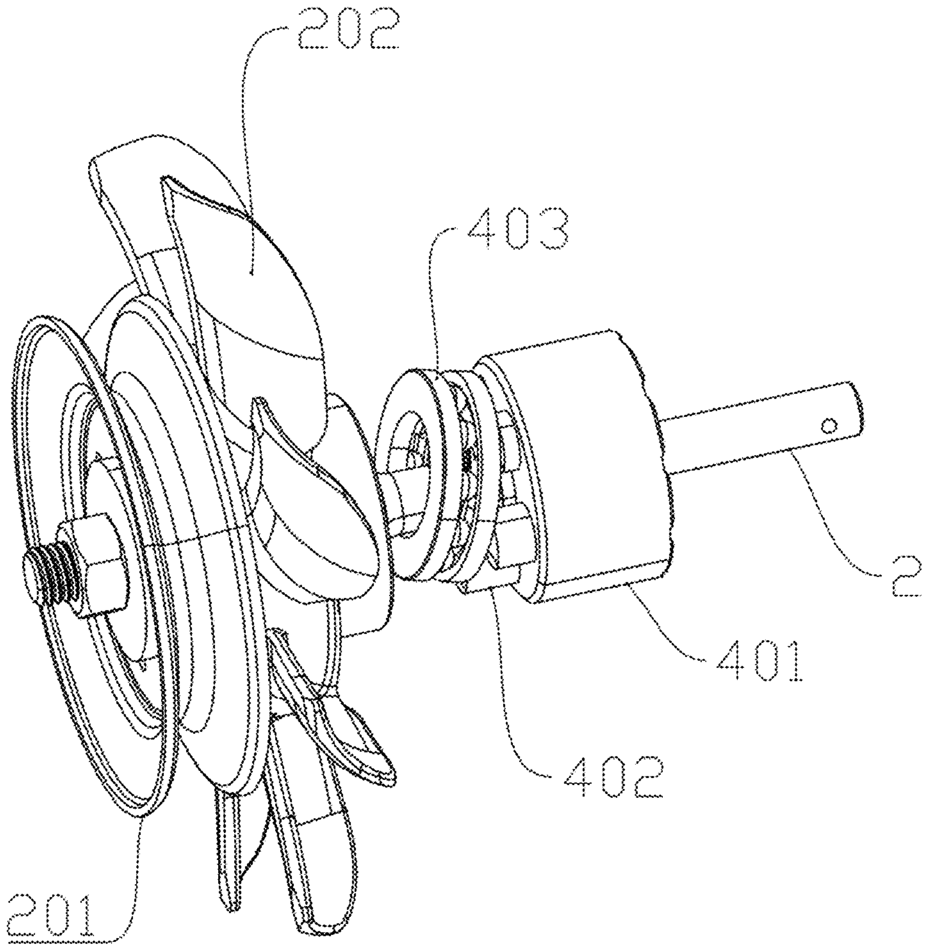
FIG. 11 is a three-dimensional diagram of a plunger pump and a main power shaft in the present application.

In some embodiments, as shown in FIG. 1, FIG. 2 and FIG. 11, a driving wheel 201 and a cooling fan blade 202 are installed on the main power shaft 2; and sealing oil seals are installed on both the main power shaft 2 and the output shaft 5. In the embodiment, the power of an external engine is transmitted to the main power shaft 2 through the driving wheel 201, and the main power shaft 2 is driven to rotate, thereby driving the plunger pump 4 to work.

Figure 4:
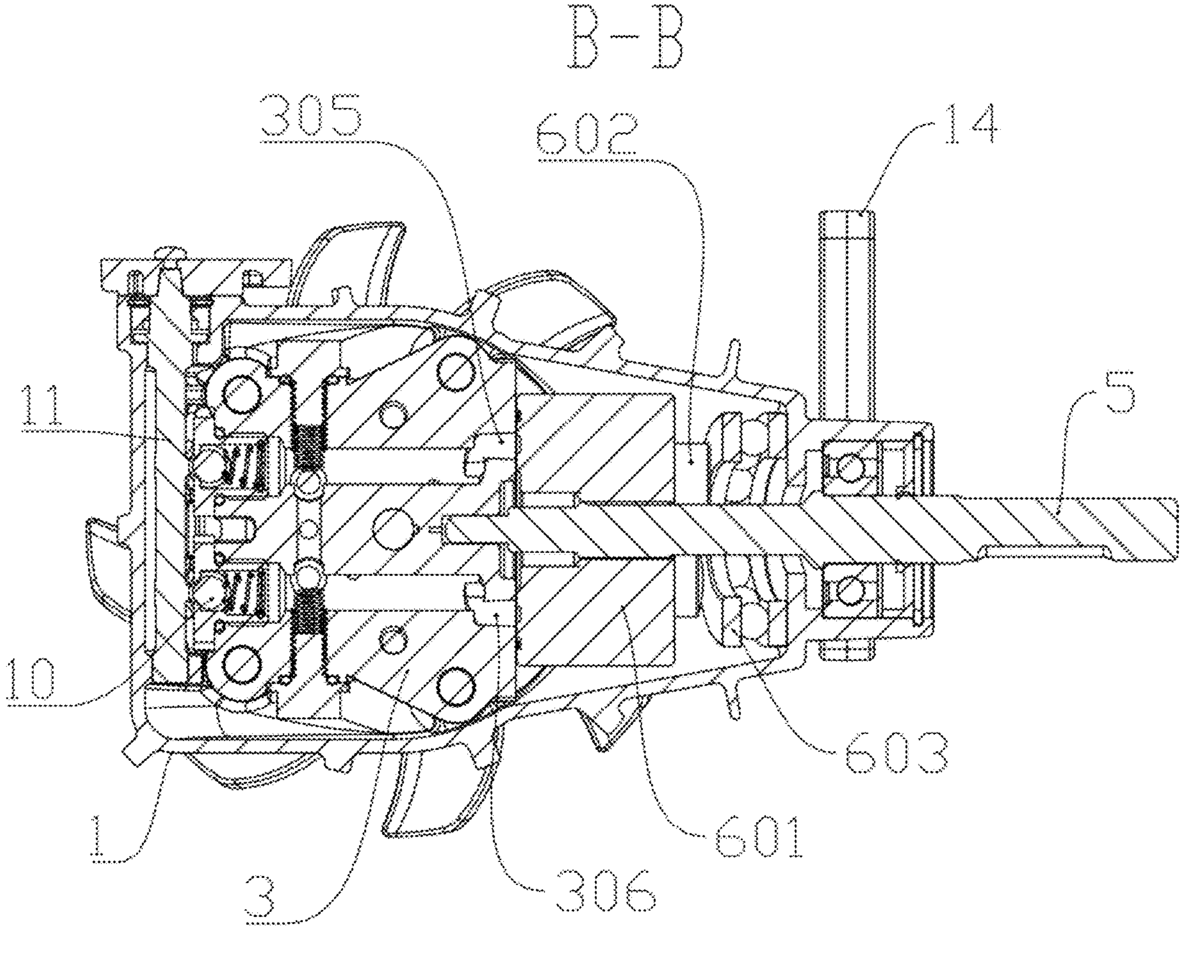
FIG. 4 is a section view of B-B of FIG. 2 in the present application.
Figure 9:
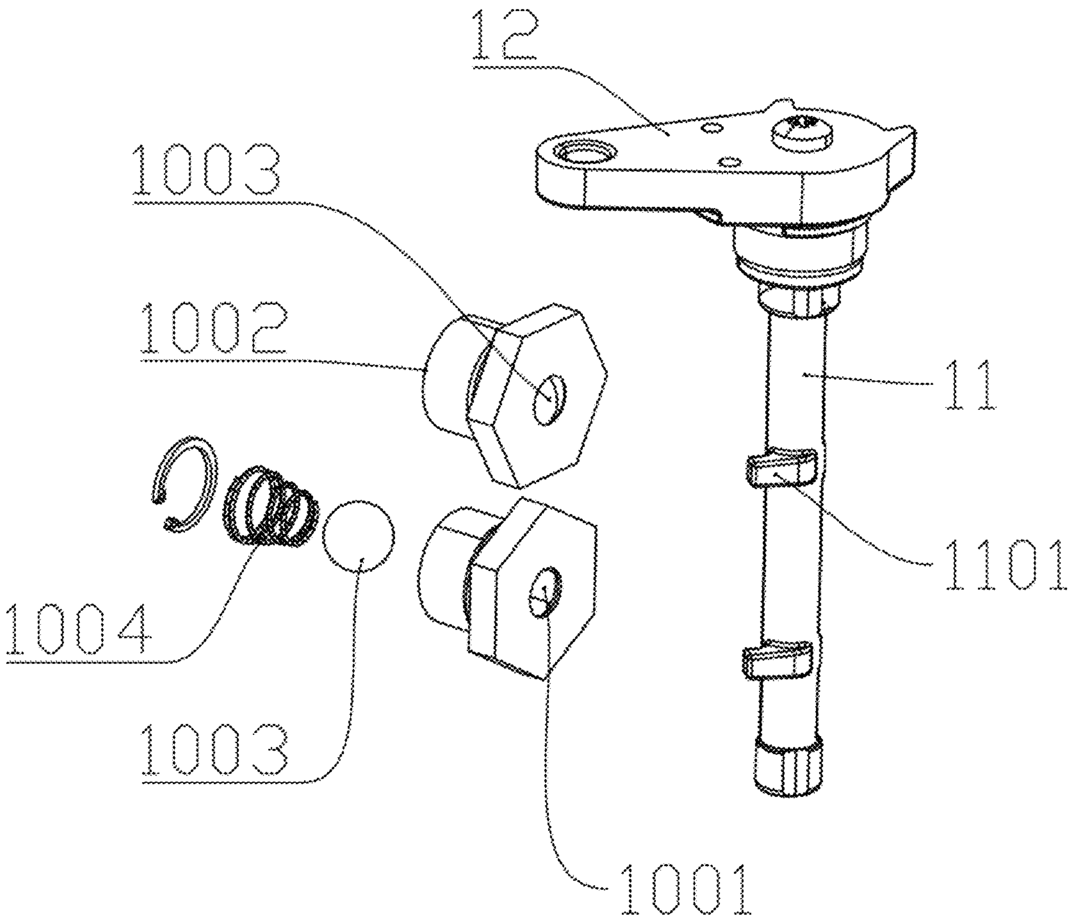
FIG. 9 is an exploded view of a bypass valve and a control valve rod in the present application.

In some embodiments, as shown in FIG. 4, FIG. 6 and FIG. 9, a bypass valve 10 and a control valve rod 11 configured to control a valve port 1001 of the bypass valve 10 to open or close are further arranged on the oil distribution plate 3, and the bypass valve 10 is configured to control an oil passage channel in the oil distribution plate 3 to conduct to or close with the inner cavity of the shell body 1; and the control valve rod 11 is rotatably installed in the shell body 1, a downward pressing protrusion 1101 is eccentrically arranged on the control valve rod 11, and the downward pressing protrusion 1101 is configured to control the valve port 1001 of the bypass valve 10 to open or close.

It should be pointed out that, the quantity and installation positions of bypass valves are not limited. When the main power shaft 2 rotates and works, the valve port 1001 of the bypass valve 10 is closed As shown in FIG. 6 and FIG. 9, a driving sheet 12 connected to the control valve rod 11 is installed on the shell body 1, the driving sheet 12 is used for connection to the external control console, the downward pressing protrusion 1101 of the control valve rod 11 is driven by the driving sheet 12 to rotate and thus presses the valve ball 1003 at the valve port 1001 to open the valve port 1001, at the moment, the oil passage in the oil distribution plate 3 conducts to the inner cavity of the shell body 1, and the bypass valve 10 is in an open status; as shown in FIG. 4 and FIG. 9, a valve seat 1002 of the bypass valve 10 is installed on the oil distribution plate 3, a valve ball 1003 and a valve ball spring 1004 are installed at the valve port 1001, the valve ball spring 1004 always pushes the valve ball 1003 to press it against the valve port 1001 in a sealed mode; and when the control valve rod 11 is rotated, the downward pressing protrusion 1101 makes contact with and downwardly presses the valve ball 1003 to enable the valve port 1001 to open.

When the output shaft 5 actively rotates, and when the main power shaft 2 does not rotate or the plunger pump 4 does not work at the moment, if the output shaft or the plunger pump 4*rotates*, the hydraulic oil in the plunger motor 6 would backflow to the oil distribution plate 3, so at the moment, the valve port 1001 of the bypass valve 10 needs to be always in an open status so that the hydraulic oil in the oil distribution plate 3 can be extracted from the valve port 1001.

Figure 5:
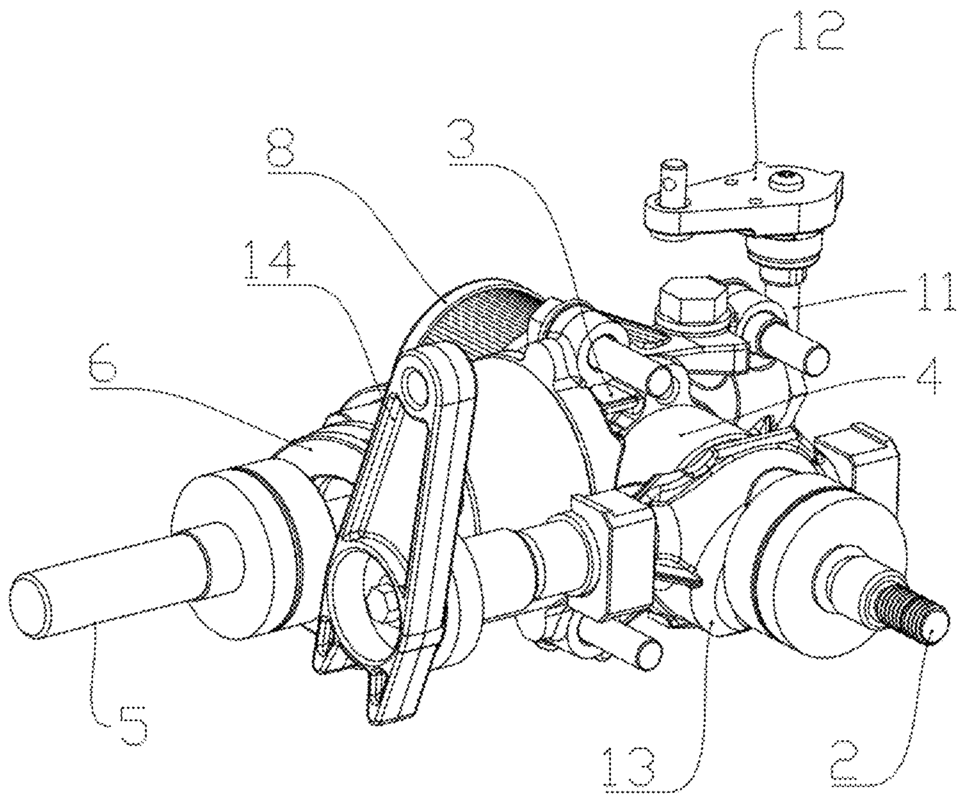
FIG. 5 is a three-dimensional diagram after a shell body is removed in the present application.
Figure 10:
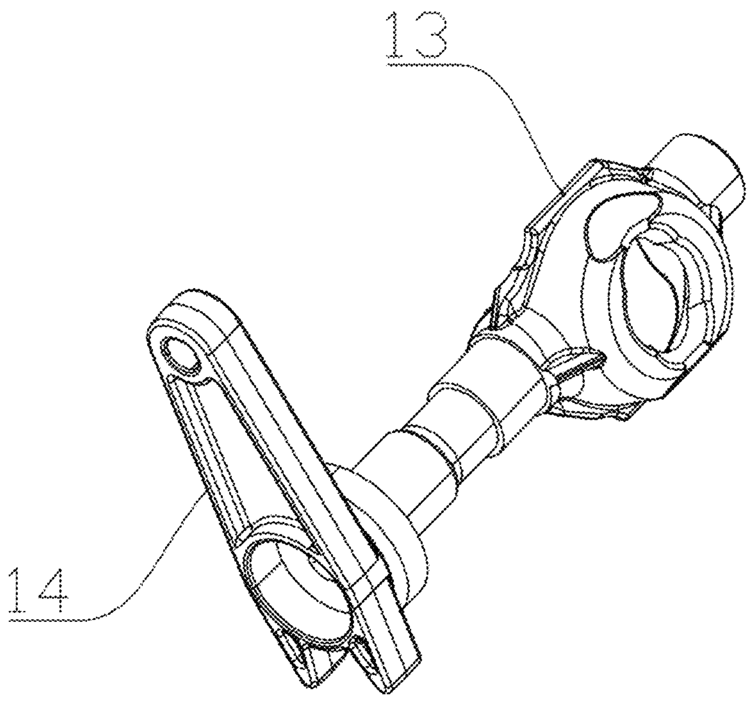
FIG. 10 is a three-dimensional diagram of an adjustment cam plate and a control shift lever in the present application.

In some embodiments, as shown in FIG. 2, FIG. 5 and FIG. 10, an adjustment cam plate 13 and a control shift lever 14 connected to the adjustment cam plate 13 are rotatably installed on the shell body 1; as shown in FIG. 11, the plunger pump 4 includes a first plunger cylinder body 401 connected to the oil distribution plate 3 and a first plunger 402 axially installed in the first plunger cylinder body 401 in a movable mode, and the first plunger cylinder body 401 is coaxially and rotatably connected to the main power shaft 2; and a first thrust bearing 403 at the plunger pump 4 is installed in the adjustment cam plate 13, an angle of inclination of the first thrust bearing 403 is adjusted by rotating the adjustment cam plate 13, the adjustment cam plate 13 may be forwardly and backwardly adjusted and rotated to drive the first thrust bearing 403 to achieve adjustment of the angle of inclination, so the adjustment cam plate 13 may be used to adjust power output of the plunger pump 4 and even reversal output of power (realized by forward inclination or backward inclination of the first thrust bearing 403).

It should be pointed out that, when a side end face of the first thrust bearing 403 is vertically arranged, at the moment, the first plunger 402 does not generate axial displacement and does not work; and through the arrangement of the adjustment cam plate 13 and the control shift lever 14, power output and reversal of the entire hydraulic actuator may be realized, and "stepless speed change" may be realized.

Figure 3:
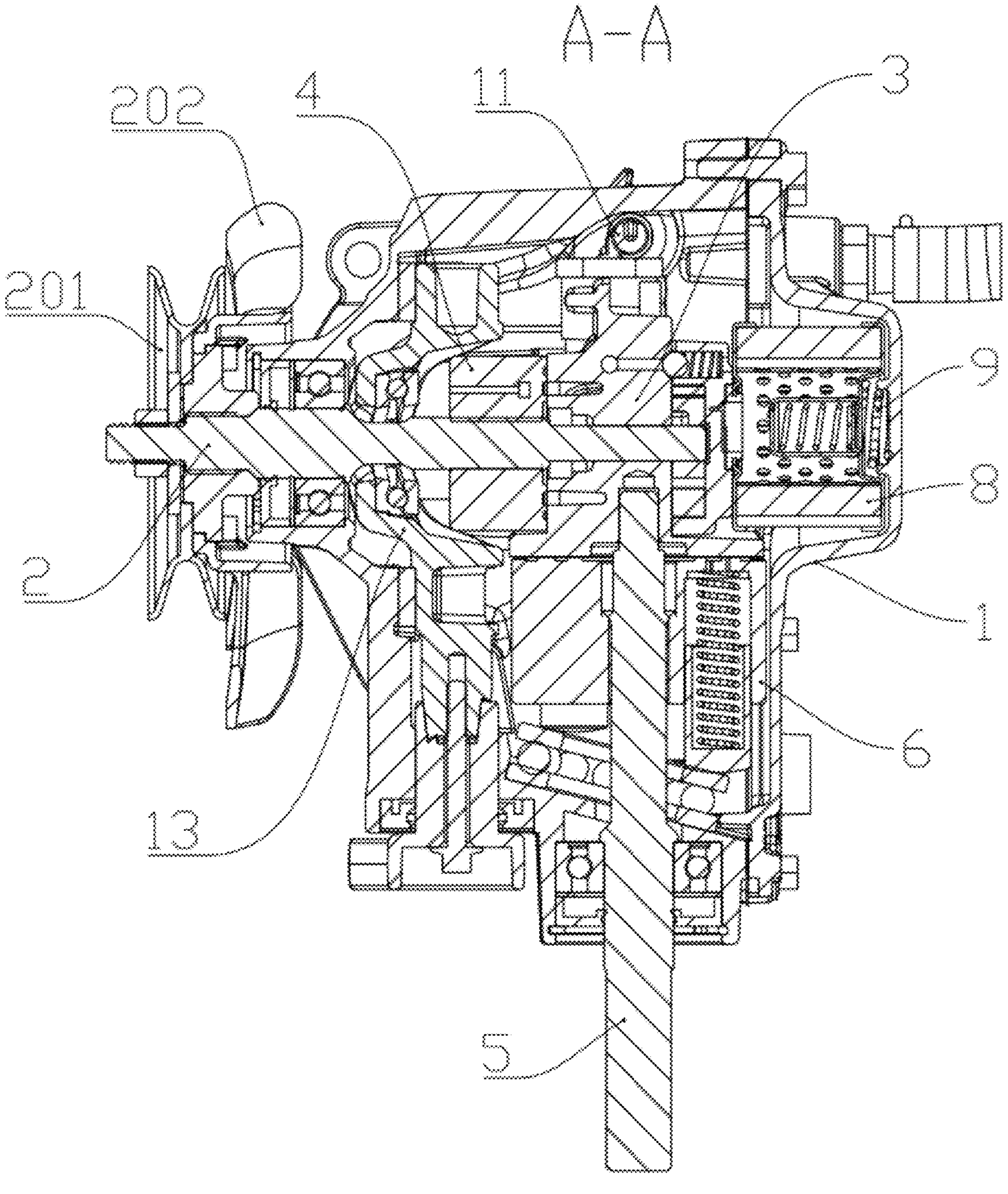
FIG. 3 is a section view of A-A of FIG. 2 in the present application.
Figure 12:
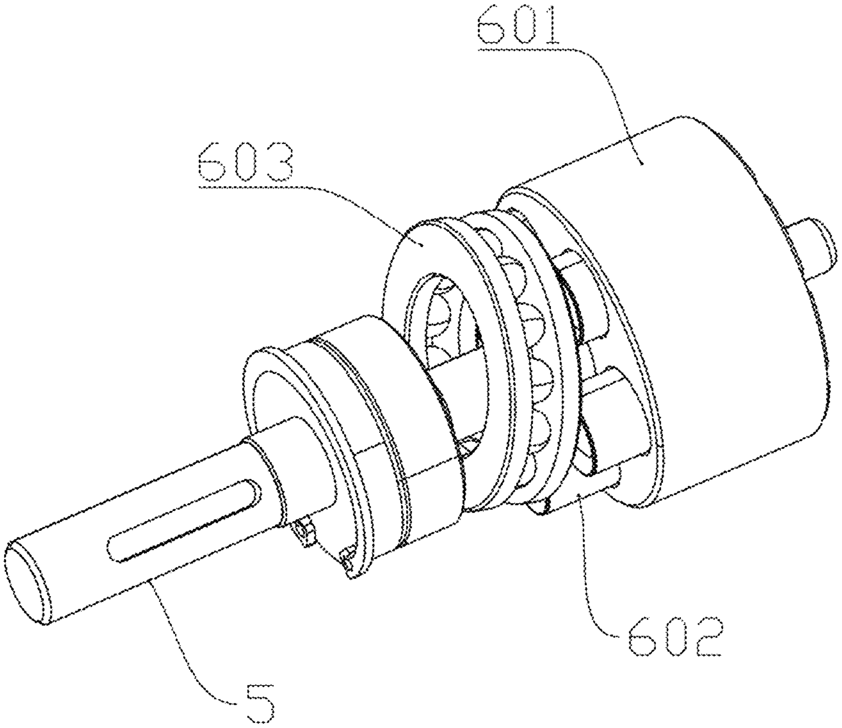
FIG. 12 is a three-dimensional diagram of a plunger motor and an output shaft in the present application.

In some embodiments, as shown in FIG. 3 and FIG. 12, the plunger motor 6 includes a second plunger cylinder body 601, a second plunger 602 and a second thrust bearing 603, and the second plunger cylinder body 601 is coaxially and rotatably connected to the output shaft 5; and the second thrust bearing 603 is arranged in the inner cavity of the shell body 1, and its angle of inclination cannot be adjusted.

It should be pointed out that, springs are arranged in both the first plunger 402 and the second plunger 602.

Figure 7:
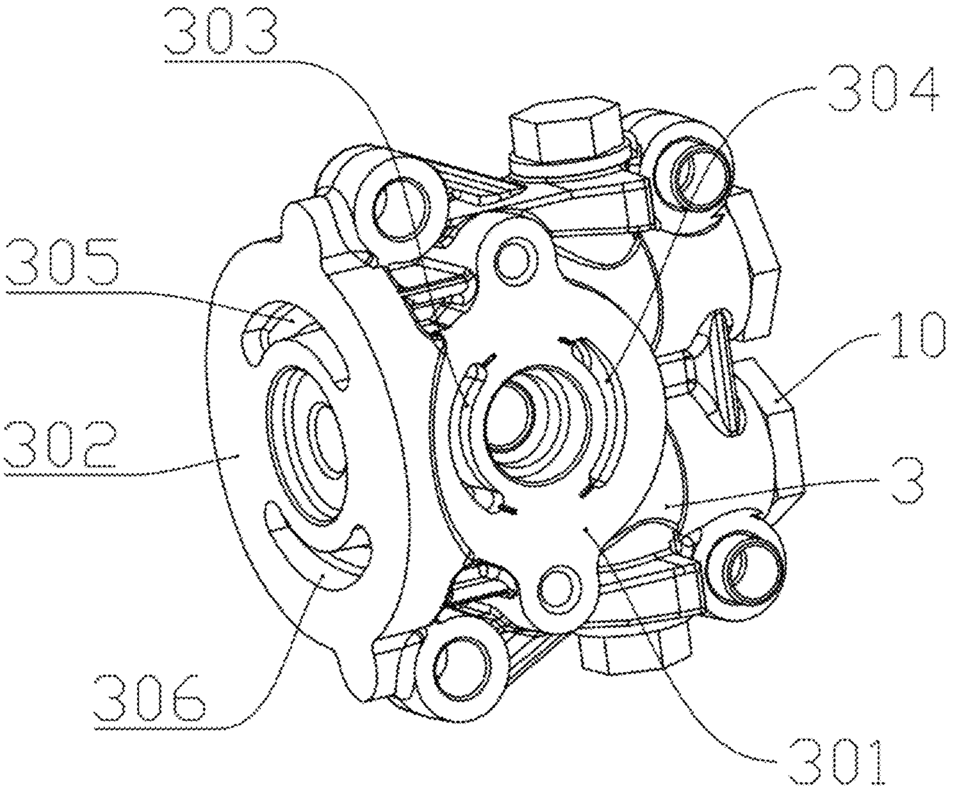
FIG. 7 is a three-dimensional diagram of an oil distribution plate and an oil inlet cover in the present application.
Figure 8:
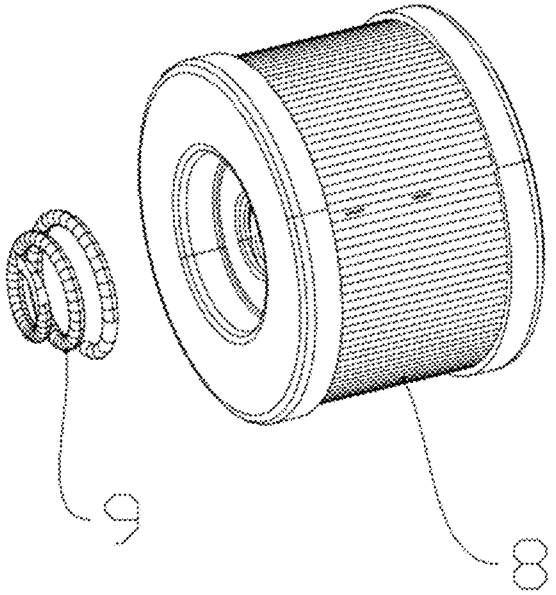
FIG. 8 is an exploded view of a filter mesh and a positioning spring in the present application.

In some embodiments, as shown in FIG. 7, a first end face 301 corresponding to the plunger pump 4 and a second end face 302 corresponding to the plunger motor 6 are arranged on the oil distribution plate 3, and the first end face 301 and the second end face 302 are perpendicular to each other; and a first oil passage 303 and a second oil passage 304 are arranged on the first end face 301, and a third oil passage 305 conducting to the first oil passage 303 and the fourth oil passage 306 conducting to the second oil passage 304 are arranged on the second end face 302. Through the above oil passages, the power of the plunger pump 4 can be vertically reversed and transmitted to the plunger motor 6, so the output shaft 5 can be driven to rotate, thus realizing output of power.

In some embodiments, the inner cavity of the shell body 1 is injected with hydraulic oil in a sealed mode, and the oil inlet cover 7 is installed on the oil distribution plate 3 in a split mode; as shown in FIG. 4, the oil inlet 701 is connected into the oil passage channel in the oil distribution plate 3 through a one-way valve; and the hydraulic oil in the shell body 1 is supplied to internal oil passages in the oil distribution plate 3 through the oil inlet 701.

In some embodiments, the output shaft 5 is connected to an external traveling mechanism (such as a traveling wheel or crawler belt) through structures such as a gear or a chain wheel. As shown in FIG. 1, the shell body 1 is connected to an oil return pot 15 through an oil pipe, the oil return pot 15 is connected into the inner cavity of the shell body 1, and a height of the oil return pot is higher than that of the shell body 1; and when the hydraulic actuator is working, the hydraulic oil in the inner cavity of the shell body 1 may be led to the oil return pot 15 in a case of heat expansion.

In some embodiments, as shown in FIG. 2 and FIG. 6, an inner side of the filter element 8 is installed at an installation cavity 702 of the oil inlet cover 7 through a positioning gasket, a gap is preserved between an outer side of the filter element 8 and the inner wall of the shell body 1, the filter element 8 is axially limited in a floating mode through the positioning spring 9, and the filter element 8 is positioned between the oil inlet cover 7 and the inner wall of the shell body 1; and the filter element 8 is convenient to install and position. By adopting the mode that the filter element 8 is positioned by the positioning spring 9, the assembly of other components is not interfered; and the gap may be preserved between the outer side of the filter element 8 and the inner cavity of the shell body 1, so that machining errors relating to a length or dimensions of the filter element 8 do not influence the assembly of other components. For example, when the filter element 8 has an excessive length, the shell body 1 will not be covered in a sealed mode, so interference is caused.

For the same or similar parts between the embodiments in the specification, reference may be made to each other. Each embodiment focuses on differences from other embodiments. In particular, for the embodiments illustrated later, the description is relatively simple, and reference may be made to the relevant part of the foregoing embodiments.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A small displacement hydraulic actuator, comprising a shell body (1), a main power shaft (2) connected to an external power source being installed on the shell body (1), and an oil distribution plate (3) being fixedly installed in an inner cavity of the shell body (1); wherein the main power shaft (2) is connected to the oil distribution plate (3) through a plunger pump (4), and an output shaft (5) for directly outputting to outside the shell body (1) is installed on the oil distribution plate (3); and the output shaft (5) is connected to the oil distribution plate (3) through a plunger motor (6), and power transmission is realized between the plunger pump (4) and the plunger motor (6) by conducting an oil passage channel; and the main power shaft (2) is arranged perpendicular to the output shaft (5), the plunger pump (4) is arranged perpendicular to the plunger motor (6), and vertical power reversal is realized through the oil distribution plate (3); and an oil inlet cover (7) is further arranged on the oil distribution plate (3), an oil inlet (701) is formed in the oil inlet cover (7), a filter element (8) is axially installed at the oil inlet (701) in a floating mode, along an axial direction of the oil inlet (701), with an axis of the filter element (8) being parallel to the axial direction of the oil inlet (701) and to an axis of the main power shaft (2), and a positioning spring (9) is installed between the filter element (8) and an inner wall of the shell body (1) along the axial direction of the oil inlet (701).

2. The small displacement hydraulic actuator according to claim 1, wherein a bypass valve (10) and a control valve rod (11) configured to control a valve port (1001) of the bypass valve (10) to open or close are further arranged on the oil distribution plate (3), and the bypass valve (10) is configured to control an oil passage channel in the oil distribution plate (3) to conduct to or close with the inner cavity of the shell body (1); and the control valve rod (11) is rotatably installed in the shell body (1), and a downward pressing protrusion (1101) is eccentrically arranged on the control valve rod (11).

3. The small displacement hydraulic actuator according to claim 2, wherein a driving sheet (12) connected to the control valve rod (11) is installed on the shell body (1), and the driving sheet (12) is configured to be connected to an external control console; and/or a valve seat (1002) of the bypass valve (10) is installed on the oil distribution plate (3), and a valve ball (1003) and a valve ball spring (1004) are installed at the valve port (1001); and when the control valve rod (11) is rotated, the downward pressing protrusion (1101) makes contact with and downwardly presses the valve ball (1003) to enable the valve port (1001) to open.

4. The small displacement hydraulic actuator according to claim 1, wherein an adjustment cam plate (13) and a control shift lever (14) connected to the adjustment cam plate (13) are rotatably installed on the shell body (1); the plunger pump (4) comprises a first plunger cylinder body (401) connected to the oil distribution plate (3) and a first plunger (402) axially installed in the first plunger cylinder body (401) in a movable mode, and the first plunger cylinder body (401) is coaxially and rotatably connected to the main power shaft (2); and a first thrust bearing (403) at the plunger pump (4) is installed in the adjustment cam plate (13), and an angle of inclination of the first thrust bearing (403) is adjusted by rotating the adjustment cam plate (13).

5. The small displacement hydraulic actuator according to claim 1, wherein the plunger motor (6) comprises a second plunger cylinder body (601) connected to the oil distribution plate (3), a second plunger (602) and a second thrust bearing (603), and the second plunger cylinder body (601) is coaxially and rotatably connected to the output shaft (5); and the second thrust bearing (603) is arranged in the inner cavity of the shell body (1).

6. The small displacement hydraulic actuator according to claim 1, wherein a first end face (301) corresponding to the plunger pump (4) and a second end face (302) corresponding to the plunger motor (6) are arranged on the oil distribution plate (3), and the first end face (301) and the second end face (302) are perpendicular to each other; and a first oil passage (303) and a second oil passage (304) are arranged on the first end face (301), and a third oil passage (305) conducting to the first oil passage (303) and the fourth oil passage (306) conducting to the second oil passage (304) are arranged on the second end face (302).

7. The small displacement hydraulic actuator according to claim 1, wherein the inner cavity of the shell body (1) is injected with hydraulic oil in a sealed mode, and the oil inlet cover (7) is installed on the oil distribution plate (3) in a split mode; and the oil inlet (701) is connected into the oil passage channel in the oil distribution plate (3) through a one-way valve, and the hydraulic oil in the shell body (1) is supplied to internal oil passages in the oil distribution plate (3) through the oil inlet (701).

8. The small displacement hydraulic actuator according to claim 1, wherein a driving wheel (201) and a cooling fan blade (202) are installed on the main power shaft (2); and sealing oil seals are installed on both the main power shaft (2) and the output shaft (5).

9. The small displacement hydraulic actuator according to claim 1, wherein the output shaft (5) is connected to an external traveling mechanism; and the shell body (1) is connected to an oil return pot (15) through an oil pipe, the oil return pot (15) is connected into the inner cavity of the shell body (1), and a height of the oil return pot (15) is higher than that of the shell body (1).

10. The small displacement hydraulic actuator according to claim 1, wherein an inner side of the filter element (8) is installed at an installation cavity (702) of the oil inlet cover (7) through a positioning gasket, a gap is preserved between an outer side of the filter element (8) and the inner wall of the shell body (1), the filter element (8) is axially limited in a floating mode through the positioning spring (9), and the filter element (8) is positioned between the oil inlet cover (7) and the inner wall of the shell body (1).

11. The small displacement hydraulic actuator according to claim 1, wherein the plunger motor (6) is arranged in parallel with the output shaft (5).

* * * * *